United States Patent
Meijer et al.

(10) Patent No.: US 8,184,280 B2
(45) Date of Patent: May 22, 2012

(54) CONTROLLABLE LIGHT ANGLE SELECTOR

(75) Inventors: Eduard Johannes Meijer, Eindhoven (NL); Ties Van Bommel, Horst (NL); Rifat Ata Mustafa Hikmet, Eindoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/934,699

(22) PCT Filed: Mar. 31, 2009

(86) PCT No.: PCT/IB2009/051349
§ 371 (c)(1),
(2), (4) Date: Sep. 27, 2010

(87) PCT Pub. No.: WO2009/122357
PCT Pub. Date: Oct. 8, 2009

(65) Prior Publication Data
US 2011/0013179 A1    Jan. 20, 2011

(30) Foreign Application Priority Data
Apr. 3, 2008   (EP) .................................... 08103352

(51) Int. Cl.
*G01J 1/56* (2006.01)
(52) U.S. Cl. ..................................................... 356/217
(58) Field of Classification Search .................... None
See application file for complete search history.

(56) References Cited

U.S. PATENT DOCUMENTS

| 4,930,853 | A | 6/1990 | Grego |
| 7,088,492 | B2* | 8/2006 | Yanagita et al. ............... 359/290 |
| 7,333,253 | B2* | 2/2008 | Kuroda et al. .................. 359/24 |
| 2002/0122613 | A1 | 9/2002 | Kittaka et al. |
| 2002/0126953 | A1 | 9/2002 | Wach |
| 2003/0235362 | A1 | 12/2003 | Sugama et al. |
| 2006/0132766 | A1 | 6/2006 | Richman et al. |
| 2007/0146701 | A1 | 6/2007 | Kiesel et al. |

FOREIGN PATENT DOCUMENTS

| DE | 4226661 A1 | 1/1994 |
| EP | 1465004 A1 | 10/2004 |
| FR | 2530831 A1 | 1/1984 |
| GB | 2385431 A | 8/2003 |
| WO | 2004099845 A1 | 11/2004 |
| WO | 2006003582 A1 | 1/2006 |

* cited by examiner

*Primary Examiner* — Tu Nguyen
(74) *Attorney, Agent, or Firm* — Mark L. Beloborodov

(57) ABSTRACT

Disclosed is a controllable light angle selecting device that includes a fixed light selecting means for transmitting light within a limited acceptance angle, optically connected to at least one light redirecting means capable of achieving a variable angular difference between light entering said light redirecting means and light exiting said light redirecting means. Also disclosed is a photometer employing such controllable light angle selecting device and arranged in the path of light between a light source and at least one light measuring sensor arranged to receive at least part of the light exiting from the controllable light angle selecting device.

11 Claims, 8 Drawing Sheets

CONTROLLABLE LIGHT ANGLE SELECTOR

FIELD OF THE INVENTION

The present invention relates to a controllable light angle selecting device and a photometer comprising a light angle selecting device arranged in the path of light between a light source and a light measuring sensor.

BACKGROUND OF THE INVENTION

Much work is performed within the field of ambient lighting systems as well as smart light management systems. The lighting solutions allow the user to flexibly determine the atmosphere created by a number of luminaries.

In general, a room is illuminated by a number of distributed luminaries, and it would be desired that an intelligent light management system would be able to measure and control the lighting characteristics of each individual luminary, as well as the scene setting characteristics of the ensemble of luminaries, or the lighting characteristics of multiple luminaries illuminating a certain area at the same time.

For this, two conditions must be met. One is the availability of light sources with tunability of color, intensity and/or emission angle. The maturing of LED-technology in combination with halogen lamps, fluorescent tubes, etc has resulted in light sources that fulfill this demand. The other prerequisite is a control feedback system that measures light properties, such as the intensity, color point and color rendering index, of the individual light sources simultaneously. In order to achieve this, optical sensors are required, for instance to measure the flux, the color point or even the full spectral distribution of the light illuminating a certain part of a room. In addition, and in order to provide a good control of the light properties, one should be able to measure what luminary illuminates which part of the room.

For that purpose, it would be desired to provide a means for controllably redirect light from a light source towards a light sensor.

An electro-optical deflector is described in U.S. Pat. No. 4,930,853 to Grego, which is capable of deflecting a collimated light beam.

However, there is still a need in the art for a light measuring device that can measure the above mentioned light properties, and determine which luminary provides what contribution to the illumination of a certain part of the room.

SUMMARY OF THE INVENTION

It is an object of the present invention to at least partly overcome the problems of the prior art and to at least partly meet the needs in the art, and thus to provide a photometer that can measure the intensity and/or the spectral content of light emanating from a certain direction, and to provide components for use in such a photometer.

Hence in a first aspect, the present invention relates to a controllable light angle selecting device, comprising a fixed light selecting means adapted to transmit light incident thereon within a limited acceptance angle, optically connected to at least one light redirecting means, which at least one light redirecting means comprises a light input side and a light output side, and a controllable means for obtaining a variable angular difference between light entering said light redirecting means via said light input side and light exiting said light redirecting means via said light output side.

Preferably, the redirection means should be capable of providing a significant angular difference between light entering and light exiting the redirection means.

In embodiments of the present invention, said fixed light selecting means may be optically connected to said output side of said light redirecting means.

In this arrangement, the light redirecting means may be used to select, by varying the angular difference between incoming and exiting light, which light, in terms of direction of origin, will be transmitted through the fixed light angle selecting means.

In other embodiments of the present invention, said fixed light selecting means is optically connected to said input side of said light redirecting means.

In this arrangement, the light redirecting means can be used to control the angle of light exiting the fixed light selecting means.

In yet another embodiment of the present invention, said fixed light selecting means is optically connected to the output side of a first light redirecting means and to the input side of a second light redirecting means.

In this arrangement, the first light redirecting means may be used to select, by varying the angular difference between incoming and exiting light, the what light, in terms of direction of origin, will be transmitted through the fixed light angle selecting means, and the second light redirecting means can be used to control the angle of light exiting the fixed light selecting means.

The light redirecting means may comprise an electro wetting cell comprising a first liquid phase having a first refractive index and a second liquid phase having a second refractive index, where the direction of the normal to the interface between said first and second phases is controllable.

The light redirecting means may alternatively comprise a liquid crystal cell comprising a birefringent liquid crystal material arranged between a first and a second substrate, and electrodes for obtaining an electrical field capable of effecting switching of said liquid crystal material, wherein the surface of said liquid crystal material facing said first substrate and the surface of said liquid crystal material facing said second substrate are non-parallel.

The light redirecting means may alternatively comprise a wedge element of a transparent material having a refractive index different from that of air, the top angle of which wedge element is controllable.

The light redirecting means may alternatively comprise an electro wetting cell comprising a first liquid phase and a second liquid phase, where the direction of the normal to the interface between said first and second liquid phases is controllable, wherein refractive flakes are arranged at said interface between said first and second liquid phases, the direction of the normal to said flakes being controllable by the direction of said interface.

The light redirecting means may alternatively comprise a refractive element of a transparent material having a refractive index different from that of air, comprising a first domain and an adjacently located second domain, wherein light is diffracted differently in said first domain from in said second domain, further comprising a domain selecting means for selectively transmitting light refracted by one of said first domain and second domain.

The light redirecting means may alternatively comprise a pivotable reflecting element In a second aspect, the present invention relates to a photometer comprising a controllable light angle selecting device of the present invention arranged in the path of light between a light source and at least one light measuring sensor, which sensor is arranged to receive at least part of the light exiting said controllable light angle selecting device.

The present inventors have found that a photometer comprising a controllable light angle selector of the present invention is advantageous.

A photometer comprising a controllable light angle selector according to appended claim 2 can be used to analyze the intensity and/or spectral content of light emanating from a certain direction, by adjusting the redirection means so that light from that certain direction is transmitted through the fixed light selecting means towards the light measuring sensor.

In embodiments, a photometer of the present invention comprises at least one light filter arranged in the path of light between said light angle selecting device and said at least one light measuring sensor.

In preferred embodiments, the transmissivity and/or the reflectivity of light of a certain wavelength of said at least one light filter depends on the angle of incidence of light on said at least one filter. Such a filter preferably comprises a dichroic interference stack.

A photometer comprising a controllable light angle selector according to appended claim 3 or 4, in combination with such a filter with angular dependency in the transmission and/or reflection, is advantageous since the resolution of the at least one light filter can be enhanced by utilizing the angular dependency. By varying the angle of incidence on the filter, different transmissivity/reflectivity profiles can be obtained from one single filter, making it possible to measure the content of more than one wavelength by using only one single filter.

In a third aspect, the present invention provides a photometer comprising at least one light measuring sensor and at least one light filter arranged in the path of light from a light source and said light measuring sensor, wherein the transmissivity and/or the reflectivity of light of a certain wavelength of said at least one light filter depends on the angle of incidence of the light on said at least one filter, said photometer further comprising a means for varying the angle of incidence of light on said light filter.

It is further noted that the present invention relates to all possible combinations of the appended claims.

BRIEF DESCRIPTION OF THE DRAWINGS

These and other aspects of the present invention will now be described in more detail, with reference to the appended drawings showing a currently preferred embodiment of the invention.

DETAILED DESCRIPTION OF EMBODIMENTS

The present invention relates to a controllable light angle selecting device and to devices, especially photometers, utilizing such (a) controllable light angle selecting device(s).

Figure 1:
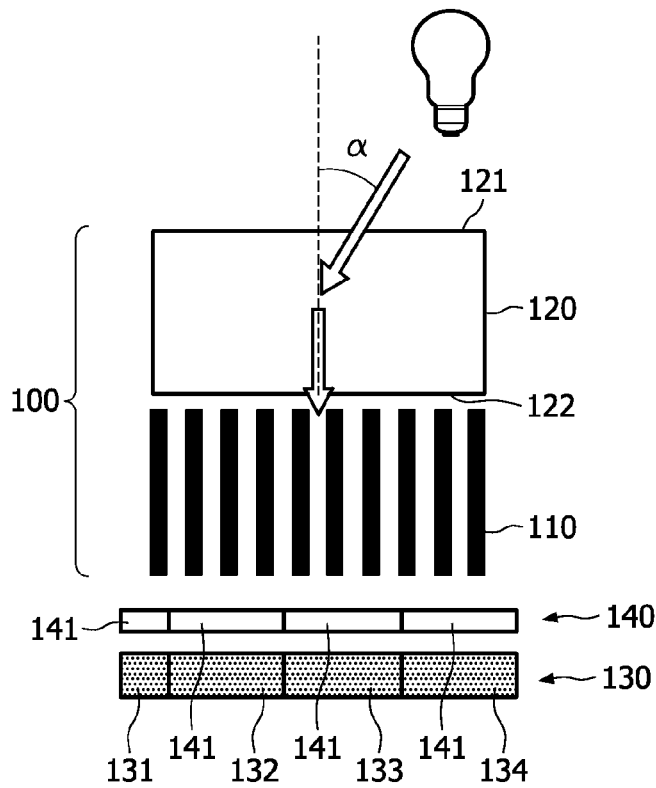
FIG. 1 illustrates one embodiment of a photometer of the present invention.

A first embodiment of a photometer of the present invention is illustrated in FIG. 1 and comprises a controllable light angle selecting device 100 that comprises a light redirecting means 120, having an input side 121 and an output side 122, and a fixed light selecting means 110 optically connected to the output side 122. The light redirecting means 120 is arranged to receive light from the surroundings via its light input side 121, and to transmit light to the fixed light selecting means 110 via the light output side 122 of the light redirecting means 120. Light exiting the light redirecting means 120 via the output side 122 is incident on the fixed light selecting means 110. Only light incident on the fixed light selecting means 110 within a defined, limited acceptance angle will be transmitted through the fixed light selecting means.

The light selecting device is controllable, in the sense that the light redirection means is controllable, as will be further described herein.

Several different designs of the light redirecting means 120 are possible, and they are discussed in a below section of this specification.

Light having passed through the fixed light selecting means 110 is received by a light measuring sensor 130, such that the intensity and/or spectral content of the light can be measured.

Optionally, and as is illustrated in FIG. 1, a light filter 140 may be arranged in the path of light between the fixed light selecting means 110 and the light measuring sensor 130, so as to selectively pass wavelengths of interest to the sensor.

The fixed light selecting means 110 has a defined acceptance angle. Light incident on the fixed light selecting means 110 within this acceptance angle will be transmitted through the fixed light selecting means 110, whereas light incident on the fixed light selecting means 110 outside this acceptance angle will be reflected away or absorbed by the fixed light selecting means 110.

Hence, essentially only light incident on the fixed light selecting means 110 within the above mentioned acceptance angle will have the possibility to be analyzed by the light measuring sensor 130.

In the photometer of this first embodiment of the invention, these characteristics of the controllable light angle selecting device 100 can be utilized to selectively analyze the intensity and/or spectral content of light emanating from different locations in the surroundings, i.e. having different angles of incidence on the input side 121 of the light redirecting means.

The light redirecting means 120 is designed so that an angle $\alpha$ between light entering the light redirecting means 120 via its input side 121 and light exiting the light redirecting means 120 via its output side 122 can be controlled and varied.

Where the light exiting the light redirecting means is coupled into a fixed light selecting means 110, the angle $\alpha$ is selected such that light coming from a certain point of interest and entering the light redirecting means via its input side 121 is redirected to within the acceptance angle of the fixed light selecting means 110, i.e. so that light from this point of interest can be transmitted through the fixed light selecting means.

Thus, to analyze the intensity and/or the spectral content of light from a certain point of interest, the angle $\alpha$ to the light input side 121 of the light redirecting means 120 is determined, and the components of the light redirecting means 120 is controlled so that essentially only light having the incidence angle α on the input side 121 of the light redirecting means 120 is allowed to pass through the fixed light selecting means 110, so as to encounter the light measuring sensor.

By a photometer according to this first embodiment of the present invention, differences in intensity and/or spectral content of light emanating from distinct directions can easily be detected.

The light measuring sensor 130 may be a conventional photometric sensor, as known to those skilled in the art, adapted to measure the intensity and/or the spectral content of light encountering the sensor. It may consist of a single sensor or an array of a plurality of sensors, where each sensor is essentially identical or where each sensor for example is adapted to detect a certain wavelength interval.

For measuring the intensity of a certain wavelength of light, a selectively transmissive filter 140 may be arranged in the path of light between the controllable light angle selecting device 100; 200; 300 and the light measuring sensor 130. Where the spectral content of the measured light is of interest, the selectively transmissive filter 140 may advantageously be a filter array or a tunable filter so that the wavelengths transmitted through the filter 140 can be varied.

In one variant of a photometer for measuring the spectral content of light, a filter array 140 comprising different regions having distinct transmissivity profiles, such as a filter wheel, is movably, such as rotatably, arranged over a single sensor 130, and the position, for example lateral or rotational position, of the filter array is varied, depending on which wavelength interval that should be detected, so that a region transmitting the wavelength interval of interest is located in the path of light between the controllable light angle selecting device 100; 200; 300 and the sensor 130.

In another variant of a photometer for measuring the spectral content of light, and as is illustrated in FIG. 1, a filter array 140, comprising a plurality of distinct domains 141, 142, 143, each having a distinct transmissivity profile, is arranged in the path of light between the controllable light angle selecting device 100; 200; 300 and a sensor array 130, comprising of a plurality of sensors 131, 132, 133, such that each sensor 131, 132 and 133, receives light transmitted through a certain one of the filter domains 141, 142 and 143, respectively.

In the above section, transmissive filters are discussed, where the light transmitted through the filter is detected by light measuring sensor. However, as will be evident to those skilled in the art, the present invention also relates to reflective filters, i.e. where the light measuring sensor is arranged to detect light reflected by said filter. This holds for all the embodiments of the invention discussed in this specification. However, the location of the sensors in relation to the filters has to be modified in such an approach when utilizing reflective filters instead of transmissive filters.

Figure 2:
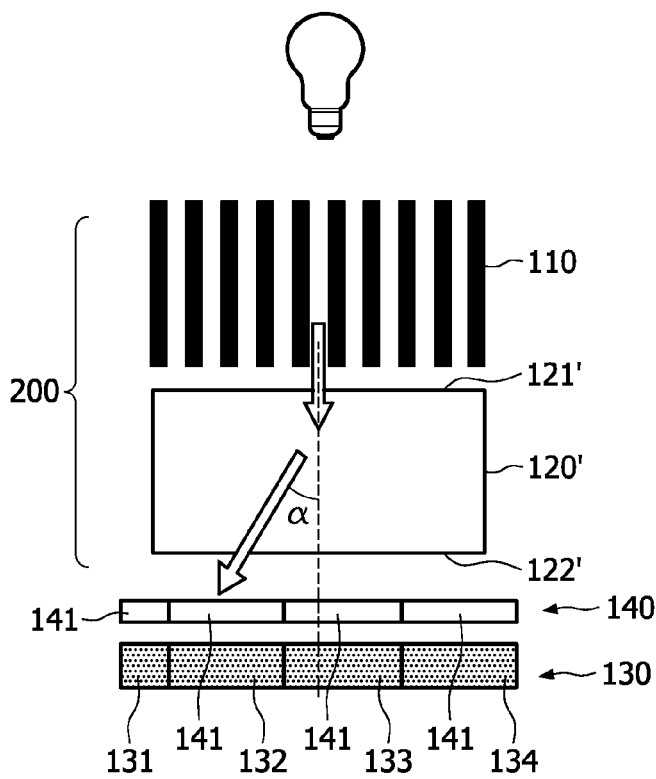
FIG. 2 illustrates another embodiment of a photometer of the present invention.

A second embodiment of a photometer utilizing a light angle selecting device of the present invention is illustrated in FIG. 2. In this embodiment, the photometer comprises a light angle selecting device 200 comprising a fixed light selecting means 110 for receiving light from the surroundings and a light redirecting means 120' arranged to receive light transmitted through the fixed light selecting means 110 via the input side 121' of the light redirecting means. Hence, in this embodiment, the fixed light selecting means 110 is optically connected to the input side 121' of the light redirecting means 120'. Further, the photometer comprises a sensor 130 arranged to receive light exiting the light redirecting means 120'.

In the path of light from the light angle selecting device 200 to the sensor 130 is arranged a filter 140, which has a transmissivity profile that depends on the angle of incidence on the filter 130, hereinafter also called angle dependent filter.

An angle dependent filter is in other words a light filter, which selectively transmits and/or reflects light of a certain wavelength (or within a certain wavelength range), i.e. the reference wavelength for the filter, but where the reference wavelength depends on the angle of incidence.

Filters having an angular dependency on the transmissivity profile are known to those skilled in the art, and include for example, but are not limited to dichroic filters based on so called interference stacks.

An interference stack is a stack of thin layers of transmissive materials where the layers exhibit higher and lower refractive indexes in an alternating fashion.

A typical, non-limiting example of such an interference stack includes an all-dielectric filter stack, comprising mirrors consisting of a quarter wavelength stack, typically separated by a dielectric spacer layer.

For example a stack built according to HLHLH S HLHLH, where the H stands for a layer of the material $TiO_2$, with a high refractive index, that has a thickness of about ¼λ and L stands for a layer of the material $SiO_2$, that has a low refractive index, that has a thickness of about ¼λ and the S stands for a spacer layer, which for example is $SiO_2$ with a thickness of about ½λ. The λ is the reference wavelength for the filter. In this case, the filter will have a high transmittance for light of λ wavelength, when this light is incident at 0 or close to 0 incidence angle.

Another, non-limiting, example of a filter suitable for use in the present invention includes the use of metal films, such as (preferably) silver or aluminum, for example 45 nm Ag-180 nm $SiO_2$-45 nm Ag.

Other examples of dichroic filters based on interference stacks are known to those skilled in the art.

The wavelength or wavelength range that is transmitted through an interference stack based angle dependent filter is calculated as a function of the thickness of the layers in the stack, the thickness being counted along the direction of light propagation through the filter. Hence, when light is incident on a planar filter at 0° (i.e. along the normal to the filter surface), the effective layer thickness equals the physical thickness of the layer. However, when the light is incident at an angle of incidence other then 0°, the effective layer thickness will be larger that the physical thickness. For example, at an angle of incidence of about 45°, the effective thickness of the layers is about 1.4 times (square root of 2) times the physical thickness of the layers.

Hence, by varying the angle of incidence on the filter, the filter response is also varied, eventually altering the transmissivity profile of the filter. Typically, the filter response blue-shifts for any angle of incidence larger than 0°.

The light redirecting means 120' in combination with the filter 140 having an angular dependence on its transmissivity may for example be utilized to increase the spectral resolution of a filter array.

By using such an angle dependent filter 140 and by varying the angle α, i.e. the difference between incoming and exiting light, it is possible to use one and the same filter for measuring the intensity of more than one wavelength. Hence, a small number of discrete filters (for example 1, 2, 3, 4 or more) in combination with a variable angle of incidence may be used to significantly increase the resolution of the detection.

This is indicated in FIG. 2, where a filter array 140 with four discrete domains 141, 142, 143, 144, each having a discrete transmissivity profile, is arranged over a sensor array 130 of four sensors 131, 132, 133, 134, each sensor detecting the light transmitted through a separate one of the filter domains.

By varying the angle of incidence on the filter array, by means of controlling the light redirecting means 120' in the angle selecting device 200, the spectral content of the detected light can be detected at a resolution significantly higher than the four measuring points representing each one of the filter domains.

Figure 3:
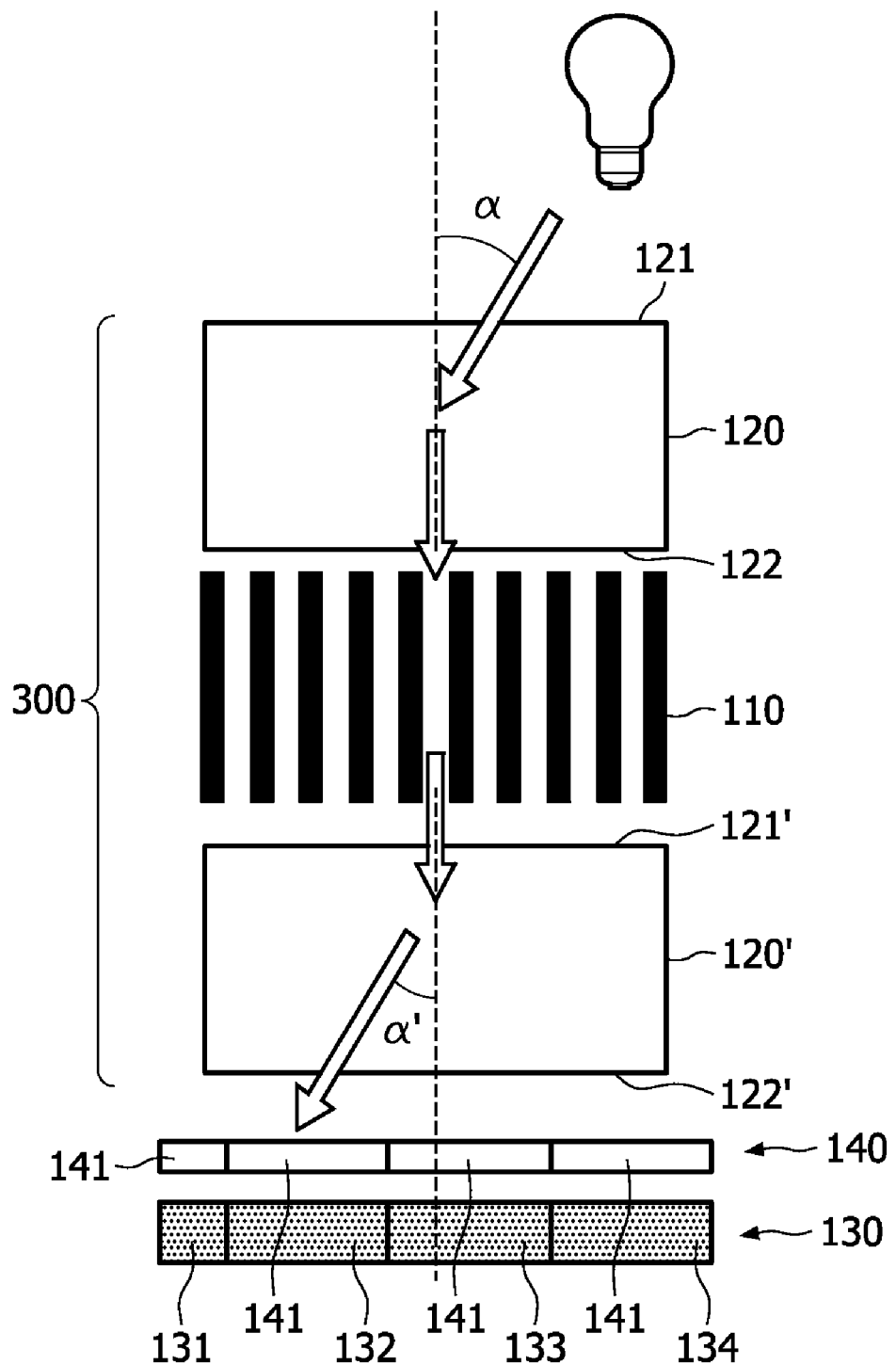
FIG. 3 illustrates yet another embodiment of a photometer of the present invention.

A third embodiment of a photometer utilizing a angle selecting device of the present invention is illustrated in FIG. 3 and represents a combination of the above discussed first and second embodiments of the present inventions.

In this third embodiment, the photometer comprises an angle selecting device 300 comprising a fixed light selecting means 110 sandwiched between a first and a second light redirecting means 120, 120'.

The first light redirecting means 120 is arranged as in the first embodiment discussed above in relation to the first embodiment of the invention, i.e. its output side 122 is optically connected to the fixed light selecting means 110, and is adapted to direct light of an incidence angle α into the fixed light selecting means 110 (i.e. within the acceptance angle for the fixed light selecting means);

The second light redirecting means 120' is arranged as in the second embodiment discussed above in relation to the second embodiment of the invention, i.e. its input side 121' is optically connected to the fixed light selecting means 110, and is adapted to direct light, exiting the fixed light selecting means 110, towards the angle dependant filter 140 so that the light is incident on the filter 140 at the variable angle α'.

The photometer further comprises a light measuring sensor 130 and an angle dependent filter 140 arranged in the path of light between said angle selecting device 300 and said light measuring sensor 130.

A photometer according to this third embodiment of the present invention combines the advantages of the first and second embodiments discussed above, for example the capability of measuring differences in intensity and/or spectral content in light emanating from different directions (as in the first embodiment) and the capability to increase the resolution in the spectral content measurements (as in the second embodiment).

In a broad sense, at least the second and third embodiments discussed above relates to a photometer comprising at least one light measuring sensor and at least one light filter arranged in the path of light between a light source, optionally having passed through a fixed light angle selector, and said light measuring sensor, wherein the transmissivity and/or the reflectivity of light of a certain wavelength of said at least one light filter depends on the angle of incidence of that light on said filter, which photometer further comprises means for varying the angle of incidence on said light filter.

In an alternative solution to the second and third embodiments discussed above, the means for varying the angle of incidence on said light filter is constituted by said light redirecting means arranged in the path of light between the fixed light selecting means and the angle dependent filter. In alternative embodiments, the light redirecting means could be exchanged for, or complemented with other/additional means for varying the angle of incidence on said light filter. One non-limiting example of such means for varying the angle of incidence on said light filter is accomplished by arranging the angle dependent filter in a movable, such as pivotable. By rotating the filter around an axis, a varying angle of incidence on the filter can be achieved, resulting in a variable transmissivity profile.

Hence, the present invention also relates to a photometer comprising at least one light measuring sensor and at least one angle dependent filter, wherein said filter is arranged in the path of light between a light source and said at least one light measuring sensor, and wherein the photometer further comprises means for varying the angle of incidence of light on said at least one filter. Such a photometer could optionally further comprise a fixed light selecting means between arranged in the light path between said light source and said at least one filter. Further, such a photometer could optionally comprise a light redirecting means arranged in the path of light between said light source and said fixed light selecting means.

A fixed light selecting means for use in the present invention is preferably designed such that only light incident on the fixed light selecting means within a limited acceptance angle is capable of passing through the fixed light selecting means. In other words, the fixed light selecting means only transmits light incident within a limited acceptance angle.

The incident light which is not within the acceptance angle of the fixed light selecting means will not pass through the fixed light selecting means, but will instead be reflected away or absorbed by the fixed light selecting means structures.

Preferably, the fixed light selecting means is further designed so that the angular distribution of light exiting the fixed light selecting means is not significantly larger than the angular distribution of light accepted into the fixed light selecting means. In preferred embodiments, the angular distribution of accepted light is further reduced in the fixed light selecting means.

The acceptance angle of the fixed light selecting means, i.e. the maximum incidence angle on the means at which light is transmitted through the fixed light selecting means is limited, i.e. the acceptance angle is significantly lower than 90°, typically lower than 20°, such as lower than 10°, for example lower than 5°.

While the actual design of the fixed light selecting means is not the subject of the present invention, many designs of fixed light selecting means are suitable for use in the present invention. Examples include an element of a light absorbing material, such as a plastic material, with one or more holes through the element. Typically, the diameter of the hole is small in relation to the thickness of the element, such that a narrow acceptance angle range is achieved.

Another example is a silicon element with absorbing structures etched in it. Trenches/holes are etched in silicon such that they are open on both sides. Subsequently, an absorbing material can be coated on the sidewalls.

In yet another example, plates with an absorbing coating are arranged parallel and mutually spaced apart, where the distance between adjacent plates is small in relation to the side length of the plates.

A light redirecting means for use in the present invention is designed so that the angle α between light entering the light redirecting means via its input surface and light exiting the light redirecting means via its output surface can be controlled and varied.

Where the light exiting the light redirecting means is coupled into a fixed light selecting means, the angle is typically selected such that light coming from a certain point of interest and entering the light redirecting means via its input side is redirected to within the acceptance angle of the fixed light selecting means, i.e. so that light from this point of interest can be transmitted through the fixed light selecting means.

Where, on the other hand, the light entering the light redirecting means via its light receiving side is outcoupled from a fixed light selecting means, the angle α is typically controlled such that light exiting the light redirecting means via its output side, is output in a desired direction.

Many possible designs are possible for the light redirecting means utilized in the present invention.

Figure 4A:
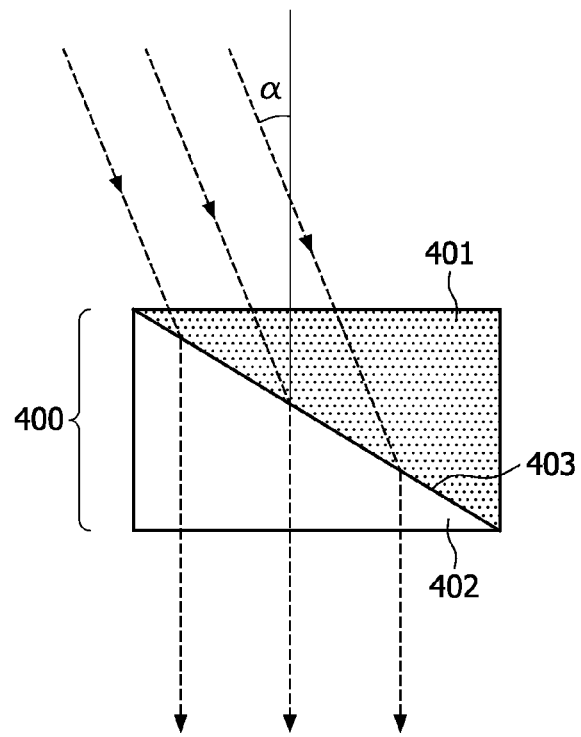
FIGS. 4 *a* and *b* illustrates a first embodiment of a light redirecting means for use in the present invention.

A first design of a light redirecting means is illustrated in FIGS. 4a and b and comprises an electro-wetting cell 400 comprising first and second immiscible liquid phases 401, 402, where the two phases exhibits different refractive indexes. The two phases are typically, but not limited to a first oil phase 401 and a second aqueous phase 402.

Figure 4B:
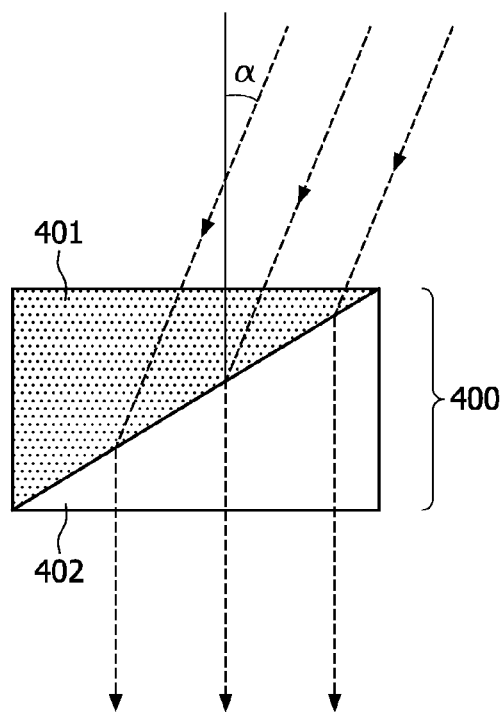

In the electro-wetting cell 400, the interface 403 between the two phases 401, 402 can be tilted by means of applying a voltage across electrodes positioned in the cell, which results in an electrostatic potential that effectively modifies the surface potential energy of a surface, thereby influencing the wetability of the first and the second phase on that surface. A refractive effect takes place, explained by Snell's law of refraction, takes place in the interface 403. Hence, the direction of the normal to the interface 403 can be controlled in relation to the desired direction of incoming and/or output light. FIGS. 4a and FIG. 4b illustrates the electrowetting cell 400 in two different refractive modes.

Figure 5A:
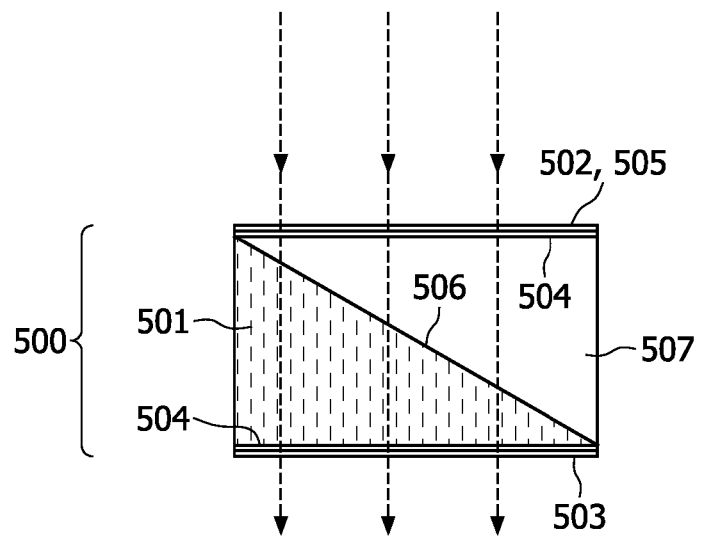
FIGS. 5 *a* and *b* illustrates a second embodiment of a light redirecting means for use in the present invention.

A second design of a light redirecting means is illustrated in FIGS. 5a and b and comprises a liquid crystal cell 500 comprising a birefringent liquid crystal material 501. Typically, the liquid crystal molecules are macroscopically aligned in the same direction by the polyimide orientation layers (not present in the drawing). A grating is arranged between two parallel substrates 502, 503, and electrodes 504 arranged to allow switching of the liquid crystal material. The light redirecting means of this second embodiment is typically also provided with a polarizer 505 arranged at the input side and/or the output side.

As the liquid crystal material is birefringent and the orientation of the liquid crystals can be changed by applying an electrical field over the liquid crystal cell, the effective refractive index for one of the polarization direction can be continuously switched between $n_o$, the ordinary refractive index, and $n_e$, the extraordinary refractive index of the liquid crystal material. For a typical liquid crystal material, $n_o$ is about 1.5 and $n_e$ is about 1.8. In order to select the desired polarization direction, a polarizer 505 is placed at the front surface of the cell, i.e. towards the input side.

By thus changing the effective refractive index of liquid crystal cell experienced by the light beam falling at a desired angle of incidence onto the liquid crystal cell 500, output of the light beam in a desired direction can be obtained.

The liquid crystal cell 500 comprising liquid crystal material 501 exhibits a wedge shape due to the presence of a polymer structure 507, which exhibits an opposing wedge shape, placed between two substrates 502 and 503 comprising electrodes. Thus, there is formed an interface 506 between the polymer and the liquid crystal which is tilted in respect to the parallel surfaces.

Further, the polymer structure is made of a material having a refractive index essentially matching the ordinary refractive index, $n_o$, of the liquid crystal bulk material 501.

Hence, when the liquid crystal material 501, as illustrated in FIG. 5a, is switched, the polarized light does essentially not experience any difference in refractive index at the interface 506 and passes essentially without any angular change in progression direction.

Figure 5B:
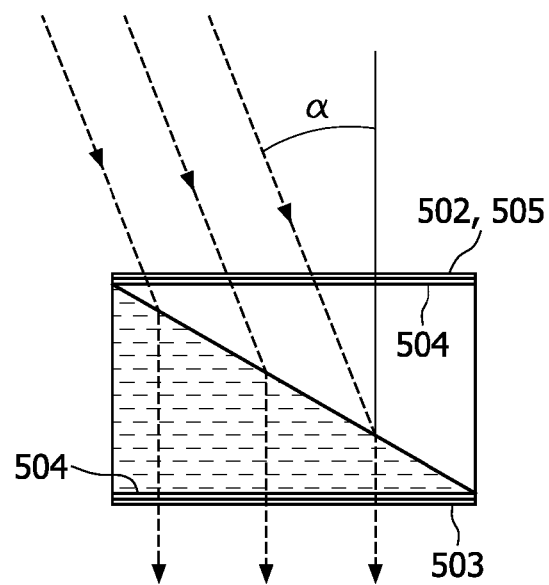

However, when the extraordinary refractive index affects the light, as illustrated in FIG. 5b, (when light is polarized in the direction of the extraordinary refractive index using the polarizer 505), the light does experience a significant difference in refractive index at the interface 506 and is refracted in the interface. Due to this, the angle of incidence on the surface of the upper substrate 502 to achieve the desired direction of light exiting the light redirecting means, and hence the difference α between incoming and exiting light, can be varied.

Figure 6:
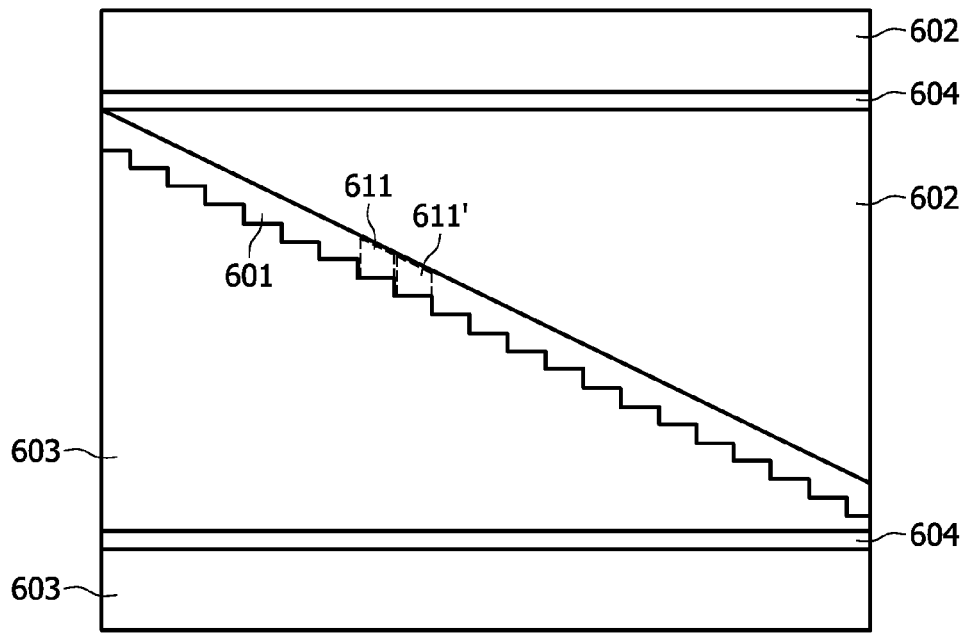
FIG. 6 illustrates a variant of the second embodiment of a light redirecting means for use in the present invention.

In FIG. 6 is illustrated a variation of the design illustrated in FIG. 5. There might in some cases be non-trivial to achieve good function of a device according to FIG. 5. Typically, there is a need for the electrodes to sandwich the liquid crystal material for arranging an electrical field over the material. The different thickness of the LC-material may result in an inhomogeneous switching. In FIG. 6 is illustrated a light redirecting means 120 comprising a thin layer of liquid crystal bulk material 601 arranged between a first and a second substrate 602, 603. In this embodiment, the liquid crystal bulk layer is shaped into a plurality of side-by-side arranged wedge-like portions 611, 611', having a slanted interface towards the upper (first) substrate 602 and a horizontal interface towards the lower (second) substrate 602. In this embodiment, this is realized by a continuous slanted interface towards the upper substrate 602 and a staircase-like interface towards the lower substrate 603.

The electrodes 604 are arranged horizontally (i.e. parallel to the input and output sides of the light redirecting means, respectively), with substrate material arranged between the electrodes 604 and the liquid crystal bulk material 601. Hence, the electric field drop over the material of the substrates 602, 603 is essentially the same in all positions along the structure, ensuring homogenous switching of the liquid crystal bulk material 601.

Figures 7A, 7B:
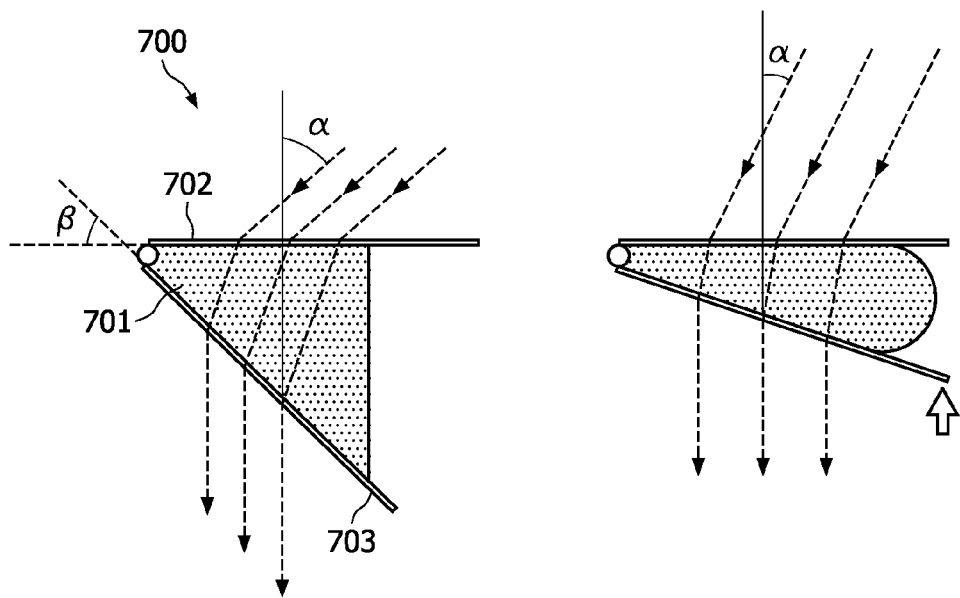
FIGS. 7 *a* and *b* illustrates a third embodiment of a light redirecting means for use in the present invention.

A third design of a light redirecting means for use in the present invention is illustrated in FIGS. 7a and b. In this design, the light redirecting means comprises a deformable wedge 700 comprising a transparent material 701 having a refractive index that differs from that of air. The wedge element is delimited by an upper planar substrate 702 and a lower planar substrate 703. Typically, the upper and lower planar substrates 702 and 703 are pivotally connected to each other so as to allow a varying top angle β. By varying the top angle β of the wedge element 700, the angle of incidence on the surface of the upper substrate 502 to achieve the desired direction of light exiting the light redirecting means, and hence the difference a between incoming and exiting light can be varied.

In a first variant of the light redirecting means illustrated in FIG. 7, the transparent material 701 of the wedge is of a elastic material, such as, but not limited to PDMS, and the top angle β of the wedge is controlled by applying a mechanical force on one or both of the substrates 702 and 703, such as to reduce or increase the wedge to angle β.

The mechanical force on the substrates 702 and/or 703 can for example be applied by piezoelectric effect, a galvanometer and a spring, etc.

FIGS. 7a and 7b illustrates the wedge element in two different configurations having two different top angles β.

In a second variant of the light redirecting means illustrated in FIG. 7, the transparent material 701 of the wedge 700 is a fluid material enclosed in a flexible membrane, and the light redirecting means further comprises means for pumping the fluid material in or out of the wedge, so as to inflate or deflate the wedge, thereby increasing or decreasing the top angle β of the wedge.

As will be realized, a combination of the mechanical influences and pumping action may be used to obtain the desired top angle β.

Figure 8A:
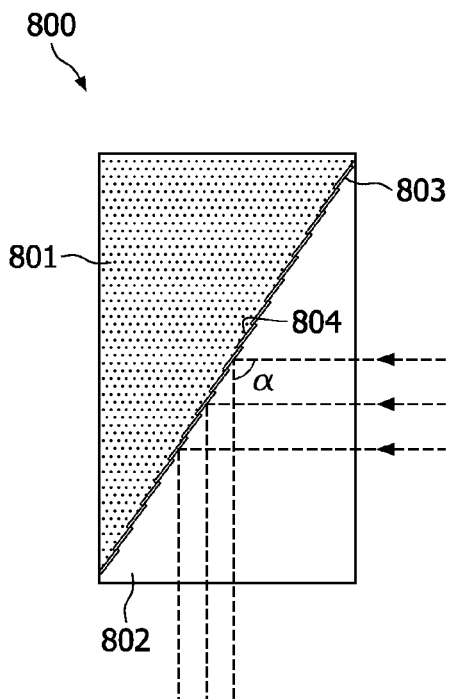
FIGS. 8 *a* and *b* illustrates a fourth embodiment of a light redirecting means for use in the present invention.
Figure 8B:
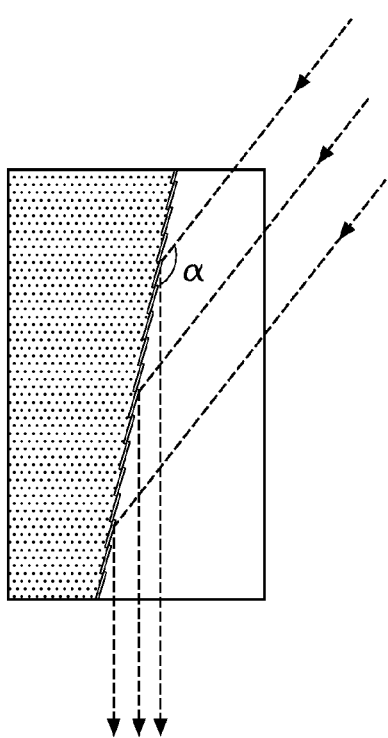

A fourth design of a light redirecting means for use in the present invention is illustrated in FIGS. 8a and b. In this design, the light redirecting means comprises an electro-wetting cell 800 comprising first and second mutually immiscible liquid phases 801, 802, typically an oil phase 801 and an aqueous phase 802. A plurality of reflective flakes 803, typically metallic flakes, are disposed in the interface 804 between the first and the second liquid phase. When changing the interface 804 orientation through the electro wetting effect, the flakes 803 remains in the interface 804, effectively changing the angle of reflection of this electro-wetting cell 800 due to a reorientation of the reflective flakes 803. As the orientation of the reflective flakes 803 changes, the angle α between incoming light and output light can be varied. FIGS. 8a and b illustrates the electro-wetting cell 800 in two different modes with different values of the angle α.

Figure 9A:
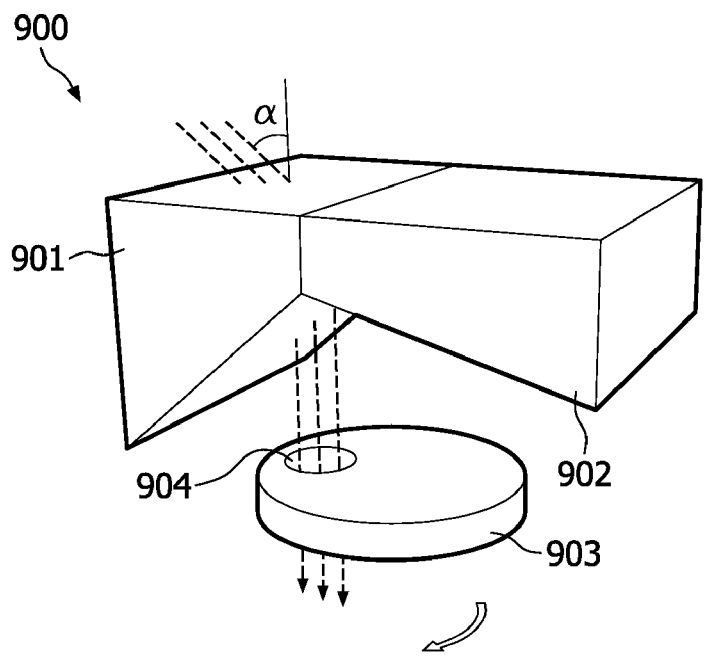
FIGS. 9 *a* and *b* illustrates a fifth embodiment of a light redirecting means for use in the present invention.

A fifth design of a light redirecting means for use in the present invention is illustrated in FIGS. 9a and b. In this design, the light redirecting means comprises a refractive optical element 900 comprising at least a first domain 901 and a second domain 902, adjacent to said first domain 901. Light is refracted differently in the first domain 901 from in the second domain 902. The light redirecting means of this fifth design further comprises a domain selecting device 903 which is capable of selectively transmitting light being refracted in either the first or the second domain 901, 902.

Figure 9B:
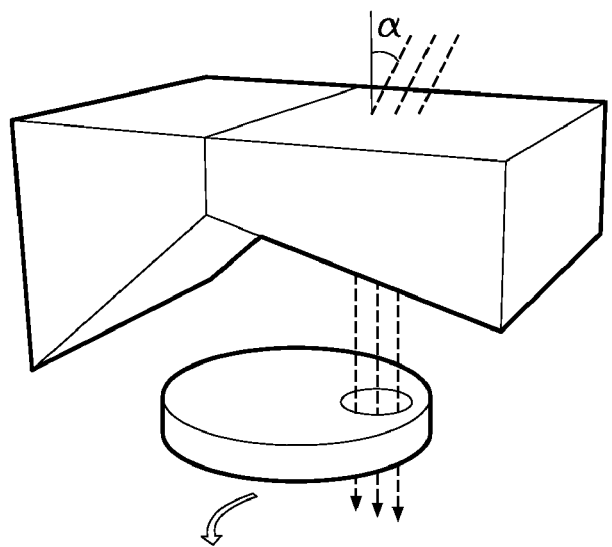

In FIG. 9, the refractive optical element 900 is represented by two adjacent wedges 901 and 902 sharing a common base surface. The first wedge (i.e. the first domain) 901 has a top angle being smaller than the top angle of the second wedge (i.e. the second domain) 902. As a result, light is diffracted differently in the first and the second wedges. The domain-selecting device 903 is represented by an opaque rotatable disc with an opening 904 allowing light to be transmitted through said opening. The disc is rotatable between a first position in which essentially only light refracted by said first wedge 901 is transmitted through the opening 904, and a second position in which essentially only light refracted by said second wedge 902 is transmitted through the opening 904. As the position of the opening 904 changes, the angle α between incoming light and output light can be varied. FIGS. 9a and 9b illustrates two different rotational positions of the opening 904, representing two different deviation angles α.

Figure 10A:
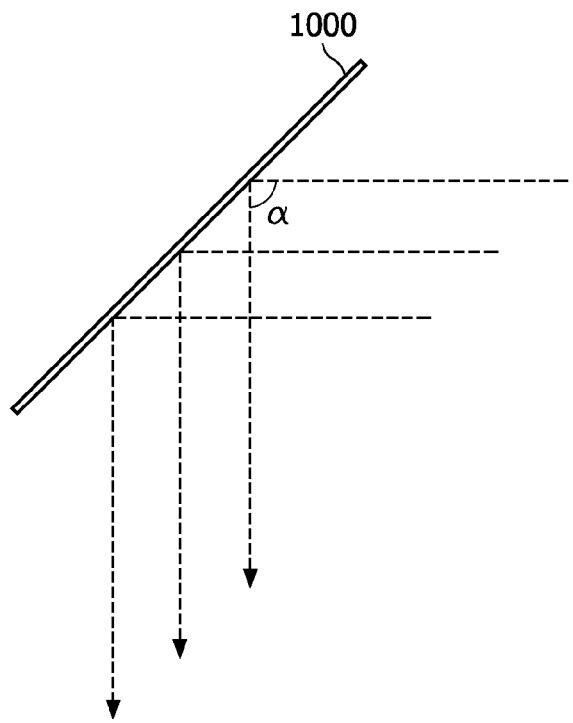
FIGS. 10 *a* and *b* illustrates a sixth embodiment of a light redirecting means for use in the present invention.
Figure 10B:
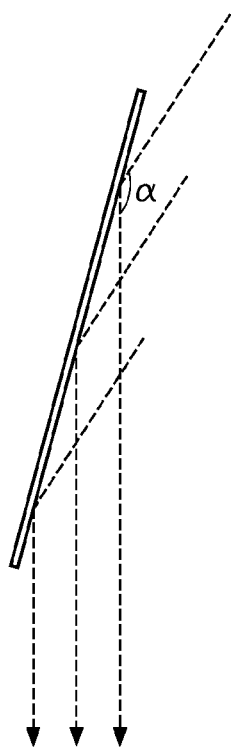

A sixth design of a light redirecting means for use in the present invention is illustrated in FIGS. 10a and b. In this design, the light redirecting means 120 comprises a pivotable reflecting element 1000, such as a mirror. Depending on the angle of the element 1000, the angle α between incoming light and output light can be varied, as is shown in FIGS. 10 a and b, illustrating two different pivot angles of the refractive element 1000, leading to two different deviation angles α.

A photometer according to the present invention may be used as such as a photometer or a spectrophotometer to measure the intensity and/or spectral content of a detected light. In addition, the measurement results from the sensor of the photometer may be used as a feed-back signal in a light controlling device. For example, if the measured intensity and/or spectral content do not comply with the nominal or desired value, the feed-back signal may be used to adjust the light source for the emission to better match the nominal value. In addition, it is for example possible to determine what light source is illuminating which part of a room.

The person skilled in the art realizes that the present invention by no means is limited to the preferred embodiments described above. On the contrary, many modifications and variations are possible within the scope of the appended claims. For example, it should be noted that in a photometer or a light angle selecting device of the present invention utilizing two or more light redirecting means, these light redirecting means may be of the same type or of different designs, as will be suitable for the area of application.

Further, additional optical elements, such as for example, but not limited to, lenses and collimators, may be arranged on the controllable light selecting device of the present invention, so as to collect and/or collimate light before it is received by the controllable light redirecting means.

The invention claimed is:

1. A controllable light angle selecting device, comprising;
   a fixed light selecting means for transmitting light incident thereon within a limited acceptance angle, and
   at least one light redirecting means optically connected to said fixed light selecting means and comprising:
      a light input side,
      a light output side; and
      a controllable means for obtaining a variable angular difference between light entering said light redirecting means via said light input side and light exiting said light redirecting means via said light output side, wherein said fixed light selecting means is optically connected to said light output side of said light redirecting means and wherein said redirecting means is configured to selectively redirect light emanating from different locations in the surroundings to enter said fixed light selecting means within said limited acceptance angle of the fixed light selecting means when said variable angular difference is controlled by said controllable means.

2. A controllable light angle selecting device according to claim 1, further comprising a second light redirecting means having an input side and an output side, wherein said fixed light selecting means being optically connected to said input side of the second light redirecting means.

3. A controllable light angle selecting device according to claim 1, wherein said light redirecting means comprises an electro wetting cell comprising a first liquid phase having a first refractive index and a second liquid phase having a second refractive index, where the direction of the normal to the interface between said first and second phases is controllable.

4. A controllable light angle selecting device according to claim 1, wherein said light redirecting means comprises a liquid crystal cell comprising a birefringent liquid crystal material arranged between a first and a second substrate, and electrodes for obtaining an electrical field capable of effecting switching of said liquid crystal material, wherein the surface of said liquid crystal material facing said first substrate and the surface of said liquid crystal material facing said second substrate are non-parallel.

5. A controllable light angle selecting device according to claim 1, wherein said light redirecting means comprises a wedge element of a transparent material having a refractive index different from that of air, the top angle (β) of which wedge element is controllable.

6. A controllable light angle selecting device according to claim 1, wherein said light redirecting means comprises
   an electro wetting cell comprising a first liquid phase and a second liquid phase, wherein the direction of the normal to the interface between said first and second liquid phases is controllable, and
   refractive flakes arranged at said interface between said first and second liquid phases, where the direction of the normal to said flakes is controllable by the direction of said interface.

7. A controllable light angle selecting device according to claim 1, wherein said light redirecting means comprises a refractive element of a transparent material having a refractive index different from that of air, comprising a first domain and an adjacently located second domain, wherein light is diffracted differently in said first domain from in said second domain, further comprising a domain selecting means for selectively transmitting light refracted by one of said first domain and second domain.

8. A controllable light angle selecting device according to claim 1, wherein said light redirecting means comprises a pivotable reflecting element.

9. A photometer, comprising a controllable light angle selecting device according to claim 1 arranged in the path of light between a light source and at least one light measuring sensor, said sensor being arranged to receive at least part of the light exiting said controllable light angle selecting device.

10. A photometer according to claim 9, further comprising at least one light filter arranged in the path of light between said light angle selecting device and said at least one light measuring sensor.

11. A photometer according to claim 10, wherein at least one of the transmissivity and the reflectivity of light of a certain wavelength of said at least one light filter depends on the angle of incidence of that light on said at least one filter.

* * * * *